United States Patent
Podgorny et al.

(10) Patent No.: US 11,263,277 B1
(45) Date of Patent: Mar. 1, 2022

(54) MODIFYING COMPUTERIZED SEARCHES THROUGH THE GENERATION AND USE OF SEMANTIC GRAPH DATA MODELS

(71) Applicants: Igor Podgorny, San Diego, CA (US); Faraz Sharafi, San Diego, CA (US); Matthew Cannon, San Diego, CA (US); Pratik Desai, San Diego, CA (US)

(72) Inventors: Igor Podgorny, San Diego, CA (US); Faraz Sharafi, San Diego, CA (US); Matthew Cannon, San Diego, CA (US); Pratik Desai, San Diego, CA (US)

(73) Assignee: Intuit Inc., Mountain View, CA (US)

( * ) Notice: Subject to any disclaimer, the term of this patent is extended or adjusted under 35 U.S.C. 154(b) by 347 days.

(21) Appl. No.: 16/177,639

(22) Filed: Nov. 1, 2018

(51) Int. Cl.
```
G06F 7/00        (2006.01)
G06F 17/30       (2006.01)
G06F 16/9535     (2019.01)
G06N 20/00       (2019.01)
G06F 16/242      (2019.01)
G06F 16/901      (2019.01)
```

(52) U.S. Cl.
CPC ........ *G06F 16/9535* (2019.01); *G06F 16/243* (2019.01); *G06F 16/9024* (2019.01); *G06N 20/00* (2019.01)

(58) Field of Classification Search
CPC ............. G06F 16/9535; G06F 16/9024; G06F 16/243; G06N 20/00
USPC ....................................................... 707/706
See application file for complete search history.

(56) References Cited

U.S. PATENT DOCUMENTS

| | | | |
|---|---|---|---|
| 5,897,670 A * | 4/1999 | Nielsen ................. | G06F 16/958 715/866 |
| 9,104,750 B1 * | 8/2015 | Dhamdhere ........ | G06F 16/3322 |
| 9,152,698 B1 * | 10/2015 | Dhamdhere ........ | G06F 16/3322 |
| 9,235,848 B1 * | 1/2016 | Gourley ............. | G06Q 30/0255 |
| 9,406,020 B2 * | 8/2016 | Arroyo ..................... | G06N 5/02 |
| 10,817,527 B1 * | 10/2020 | Setlur ................. | G06F 3/04847 |
| 2002/0123945 A1 * | 9/2002 | Booth .................... | G06Q 10/06 705/30 |
| 2007/0157092 A1 * | 7/2007 | Wadhwa ................. | G06F 9/453 715/707 |
| 2009/0049042 A1 * | 2/2009 | An ......................... | G06Q 30/02 |

(Continued)

*Primary Examiner* — Binh V Ho
(74) *Attorney, Agent, or Firm* — Ferguson Braswell Fraser Kubasta PC

(57) ABSTRACT

A method for executing a computerized query includes receiving a new query from a user device. The query includes natural language text. Based on a type of user, and using an alternative term generator, a selected data model is selected from among pre-determined data models. The selected data model is particular to the type of user. Each of the pre-determined data models includes a corresponding semantic graph data model that establishes semantic relationships between words. Query words in the natural language text are compared to the selected data model using the alternative term generator to find at least one alternative term. The alternative term has a semantic relationship to a query word in query words. The semantic relationship exceeds a first threshold value. The alternative term is substituted for a query word to form a revised query. The revised query is executed on a search engine using the alternative terms.

18 Claims, 8 Drawing Sheets

(56) References Cited

U.S. PATENT DOCUMENTS

| | | | |
|---|---|---|---|
| 2011/0179084 A1* | 7/2011 | Waddington | G06Q 30/02 707/794 |
| 2012/0173560 A1* | 7/2012 | Chowdhury | G06F 16/954 707/766 |
| 2013/0290339 A1* | 10/2013 | LuVogt | G06Q 10/10 707/740 |
| 2014/0089337 A1* | 3/2014 | Xu | G06F 16/3322 707/758 |
| 2015/0206063 A1* | 7/2015 | Santero | G06Q 30/016 706/12 |
| 2016/0063059 A1* | 3/2016 | Krauss | G06F 16/24539 707/767 |
| 2016/0217533 A1* | 7/2016 | Laaser | G06Q 40/123 |
| 2017/0060930 A1* | 3/2017 | Elkherj | G06F 16/25 |
| 2017/0099360 A1* | 4/2017 | Levi | G06F 16/955 |
| 2017/0351830 A1* | 12/2017 | Burger | G16H 20/00 |
| 2018/0129673 A1* | 5/2018 | Pandey | G06Q 10/063112 |
| 2019/0073598 A1* | 3/2019 | Giovannini | G06N 5/043 |
| 2019/0130023 A1* | 5/2019 | Kataria | G06F 16/3338 |
| 2020/0117751 A1* | 4/2020 | Kim | G06F 16/34 |

\* cited by examiner

MODIFYING COMPUTERIZED SEARCHES THROUGH THE GENERATION AND USE OF SEMANTIC GRAPH DATA MODELS

BACKGROUND

Use of computerized search engines to find information is common. Certain Web sites may also have their own search engines for finding information on that Web site or on related Web sites. A query in the form of one or more keywords may be input into the search engine, and query results are returned.

SUMMARY

One or more embodiments provide for a method for executing a computerized query. The method includes receiving a new query from a user device. The new query includes natural language text. The method also includes selecting, by the computer processor, based on a type of user, and using an alternative term generator, a selected data model from among pre-determined data models. The selected data model is particular to the type of user. Each of the pre-determined data models includes a corresponding semantic graph data model. The corresponding semantic graph data model establishes semantic relationships between words. The method also includes comparing query words in the natural language text to the selected data model using the alternative term generator to find at least one alternative term. The alternative term has a semantic relationship to a query word in query words. The semantic relationship exceeds a first threshold value. The method also includes substituting the alternative term for a query word to form a revised query. The method also includes executing the revised query on a search engine using the alternative terms.

One or more embodiments also provide for a system. The system includes a computer processor and a persistent storage device. The persistent storage device stores past domain-specific queries from users of a defined type. The past queries includes natural language text. The storage device also stores domain-specific documents including natural language text describing information in a specific information domain that corresponds to the past domain-specific queries. Together past domain-specific queries and the domain-specific documents comprise an input. The system also includes a machine learning model trainer for executing on the computer processor to cause the computer processor to train a machine learning model using past domain-specific queries and the domain-specific documents to create a trained machine learning model. The system also includes a semantic graph data model generator for executing on the computer processor to cause the computer processor to use the trained machine learning model to establish semantic relationships between words from the past queries and domain words from the domain-specific language documents. The semantic graph data model generator is also for executing on the computer processor to cause the computer processor to determine semantic similarities between the words and the domain words. The semantic similarities between a first number representing no correlation in meaning and a second number representing a perfect match in meaning. The semantic graph data model generator is also for executing on the computer processor to cause the computer processor to: build a semantic graph data model using the semantic similarities. Distances between the words and the domain words represent the semantic similarities.

One or more embodiments also provide for a persistent storage device including computer readable program code for causing a computing system to: receive a new query from a user device. The new query including natural language text. The computer readable program code is also for causing the computing system to select, by the computer processor, based on a type of user, and using an alternative term generator, a selected data model from among pre-determined data models. The selected data model is particular to the type of user. Each of the pre-determined data models includes a corresponding semantic graph data model. The corresponding semantic graph data model establishes semantic relationships between words. The computer readable program code is also for causing the computing system to compare query words in the natural language text to the selected data model using the alternative term generator to find at least one alternative term. The at least one alternative term has a semantic relationship to a query word in the query words. The semantic relationship exceeds a first threshold value. The computer readable program code is also for causing the computing system to substitute the alternative term for a query word to form a revised query. The computer readable program code is also for causing the computing system to execute the revised query on a search engine using the alternative terms.

Other aspects of the invention will be apparent from the following description and the appended claims.

DETAILED DESCRIPTION

Figure 1:
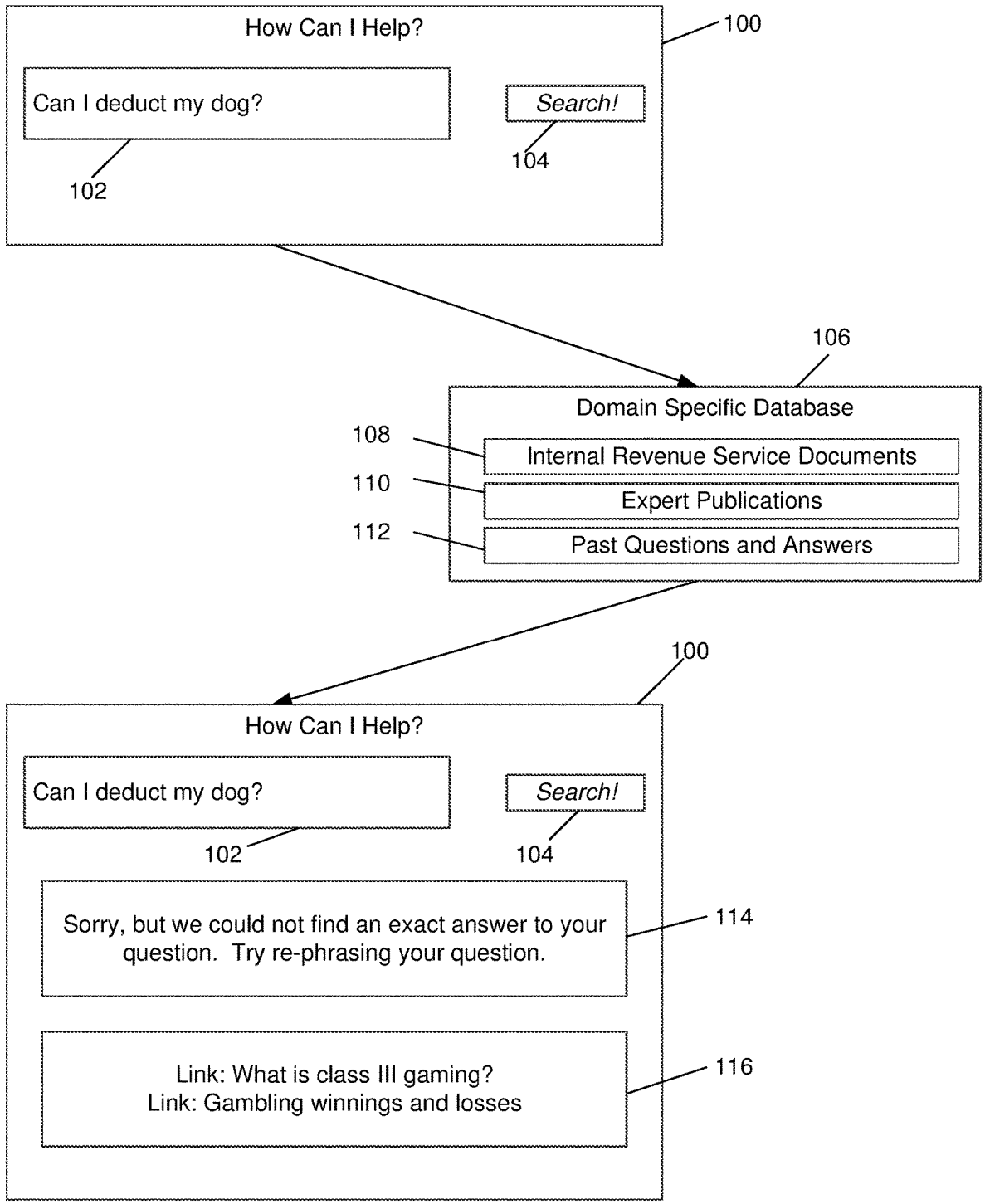
FIG. 1 and FIG. 2 depict schematic system diagrams in accordance with one or more embodiments.

Specific embodiments will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or proceed) the second element in an ordering of elements.

Further, although the description includes a discussion of various embodiments of the invention, the various disclosed embodiments may be combined in virtually any manner. All combinations are contemplated herein.

In general, embodiments of the invention are directed to improved computerized searches in a domain-specific context through the generation and use of semantic graph data models. A domain-specific context may be a particular area of knowledge, such as but not limited to information about taxes and finances. In domain-specific contexts, using common terms in common search engines often returns no results or irrelevant results that frustrate a user. Often, the frustrating result occurs because the user does not know the proper domain-specific terms to use for a query.

For example, assume a user is preparing the user's taxes. The user is not a tax expert, but wants to know whether the user can deduct expenses related to ownership of a dog. To find the information, the user browses to the Web site maintained United States Internal Revenue Service (the "IRS"), and enters the search term "can I deduct my dog?" in the search box of the IRS-provided search engine. The answer to the question is not returned. The alternative answers provided by the search engine are likewise not helpful to the user, as the alternative answers relate to obtaining free help with a tax return, when an employer can deduct automatic enrollment contributes from employee wages, what to do if a user cannot pay taxes, and other information irrelevant to the subject matter of the actual query. The user becomes frustrated because the user does not know how to rephrase the question using domain-specific terms present in the IRS's database. Properly phrased domain-specific terms would more likely return a relevant result.

The frustrating result only occurs with respect to computerized searches, because a human tax expert would instantly be able to appraise what the user actually meant by the query: i.e., "can I deduct expenses related to pet care or animal care from my taxable income?" However, without the one or more embodiments described herein, a computer simply cannot make the determination, and thus the results returned by the computerized search engine will be frustratingly irrelevant.

The one or more embodiments address the issue by providing a specific technical approach that teaches a computer how to substitute domain-specific words for the actual words used in a query. A search query, using the proper domain-specific words, is much more likely to return an answer relevant to the user. Thus, the one or more embodiments address a computer-oriented technical issue with a technical approach that improves computer functionality as described above.

FIG. 1 depicts a schematic system diagram in accordance with one or more embodiments. In particular, FIG. 1 describes in more detail the technical issue addressed by the one or more embodiments.

User interface (100) is executable by a computer and displayed to a user on a client computer, which may be in the form of a Web browser. Alternatively, the user interface (100) can be software specific to some other search engine that executes either on the local client computer, or more commonly on a server computer. The user interface (100) displays a human-readable prompt, "How can I help?" and a dialog box (102) in which to input a query. The user enters the query into the dialog box (102) using an input device. The user then hits the "Search!" button (104) to execute the query. Again, the query is "Can I deduct my dog?". Note that interaction with dialog box (102) may be performed using any useful user input device, including a mouse, a keyboard, a microphone for receiving voice interaction, etc.

The query is then executed by the search engine by comparing the words used in the query to a domain-specific database (106). A domain is a set of information applicable to a specific type of knowledge. For example, a tax domain is information related to taxes and taxation. Similarly, a medical domain is information relating to medical practices, devices, and substances. Many different domains are contemplated. Whichever domain is of interest, the domain-specific database (106) contains information specific to that domain. In this case, the domain-specific database (106) contains internal revenue service documents (108), publications (110) published by tax experts, and past questions and answers (112) posed by other users.

The search engine then returns a result in user interface (100). Because the search engine could not find words in the domain specific database (106) that correspond exactly to the words used in the query, the user interface (100) displays alternative answers. Thus, display area (114) displays the answer "Sorry, but we could not find an exact answer to your question. Try re-phrasing the question." Display area (116) displays two links to documents that the search engine calculated may be relevant to the user's query in order to try to help the user rephrase the query. In this case, the two links in the display area (116) are "What is class III gaming?" and "Gambling winnings and losses." To a human, the two results are irrelevant and likely do not answer the user's question.

Note that the result was actually achieved at www.IRS.gov using their database search engine. The actual phrase "can I deduct my dog?" was entered in the dialog box, and the top two results actually returned are shown in display area (116).

A human can instantly assess that the alternative answers in display area (116) are irrelevant to the query. However, a user who is not a subject matter expert in the domain (for example, not a tax expert), may not know the proper words to use to re-phrase the question in a manner that the search engine can use to return a result the user would considered to be relevant. Thus, the user's intended search is frustrated.

A computer, being limited to manipulating ones and zeroes, cannot assess intent as can a human. Thus, a technical issue exists with respect to how to instruct a computer to automatically change a search query into a revised search query that better matches the user's intent.

The one or more embodiments address such a technical issue through improving a computer. In particular, the one or more embodiments described below provide specific technical instructions regarding how to instruct a computer to replace a received search query with a revised query which may be more likely to return results which the user will consider to be relevant.

By way of counter example to the frustrating user experience described with respect to FIG. 1, the one or more embodiments provide for using a semantic graph data model to serve as a basis for determining alternative search terms before the query is executed. The alternative terms used are generated from the semantic graph data model according to rules and policies pre-programmed into an alternative term generator. The semantic graph data model itself may be constructed using unsupervised machine learning applied to domain specific documents and past queries of human users. A specific example of this process is described with respect to FIG. 6.

Figure 2:
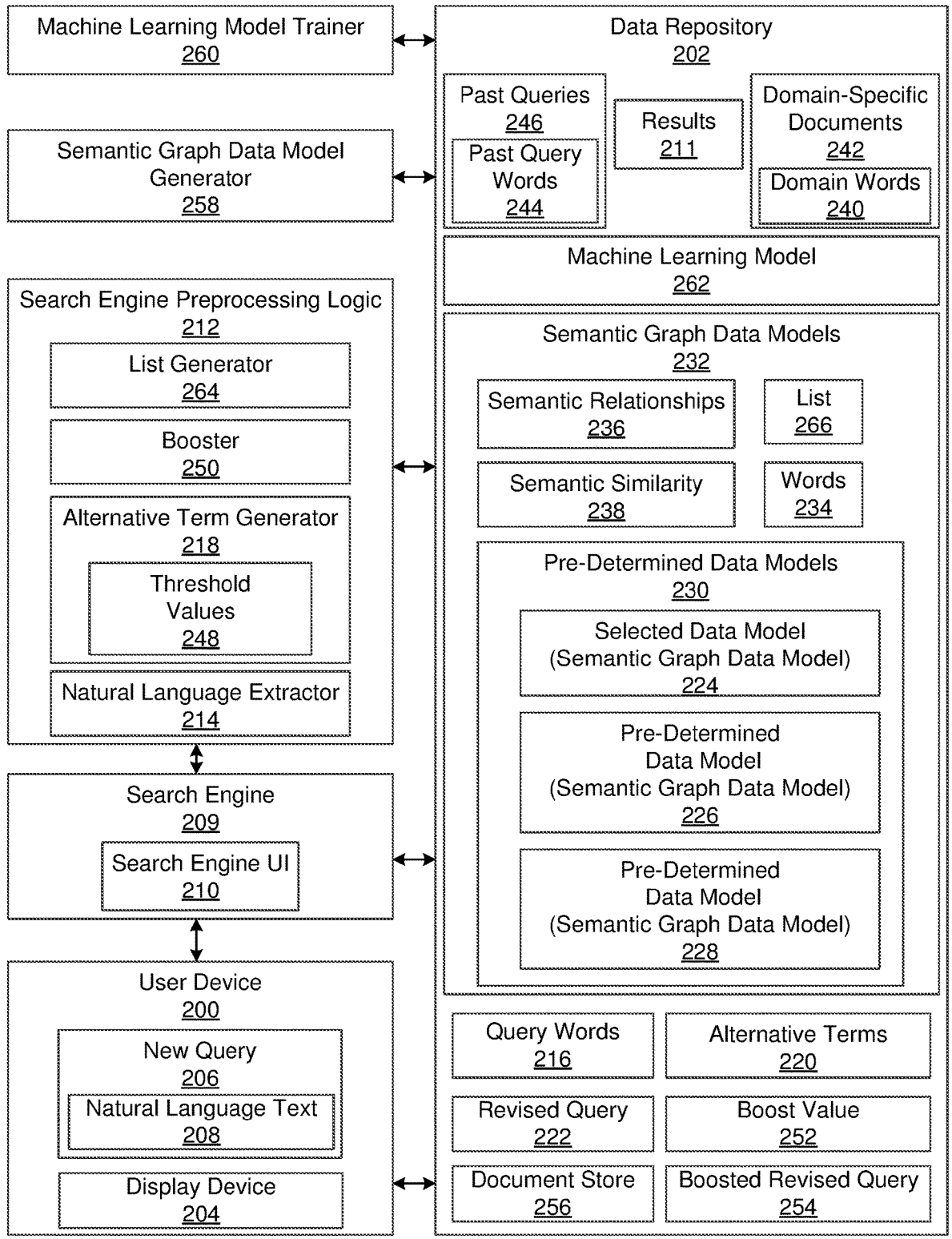

However, attention is first turned to a general description of the one or more embodiments, and in particular reference is made to FIG. 2. FIG. 2 depicts a schematic diagram in accordance with one or more embodiments that presents an architecture that addresses the technical issue described with respect to FIG. 1. The architecture of FIG. 2 presents a technical approach which can be used to teach a computing system how to return more relevant results when the search terms do not correspond to domain-specific words. The software components shown in FIG. 2 are executable by a computing system. Note, however, that the software components of FIG. 2 may be replaced by firmware in some embodiments, though the overall architecture would remain similar.

The architecture shown in FIG. 2 includes a user device (200) and a number of software components which communicate with data repository (202). Data repository (202) may be one or more volatile and/or persistent storage devices. An example data repository is described with respect to FIG. 7A and FIG. 7B, which may be managed by one or more computing systems in a possibly networked environment.

Data repository (202) may include a storage device on the user device (200), a storage device on a server computing system, or both. The data repository (202) includes query words (216), alternative terms (220), revised query (222), boost value (252), boosted revised query (254), document store (256), past queries (246), past query words (244), results (211), domain-specific documents (242), domain words (240), machine learning model (262), semantic graph data models (232), semantic relationships (236), semantic similarity (238), list (266), words (234), pre-determined data models (230), selected data model (semantic graph data model) (224), pre-determined data model (semantic graph data model) (226), and pre-determine data model (semantic graph data model) (228). Each of these components are described below.

Query words (216) are individual words of a search query, such as new query (206) in user device (200). Query words may be actual words, or may be misspelled words, acronyms, numbers, or other alphanumeric text. Query words, in many cases, are taken from the words used in a natural language sentence.

Alternative terms (220) are words that replace or are substituted for the query words (216). In one or more embodiments, the alternative terms (220) are not only synonyms of the corresponding replaced query words (216), but may also include semantically related words. A semantically related word is a word within a pre-determined distance of a query word (216) on a selected semantic graph data model (224). For example, the word "cat" may be semantically related to the word "dog" because the two words are within a pre-determined distance of each other on the selected semantic graph data model (224). A semantically related word may be an antonym of one or more of the query words (216) in some embodiments. Additionally, the distance between semantically related words may vary based on the specific domain to which the words have been assigned. For example, the words "dog" and "cat" may be closer in a tax domain relative to the same words other domains, such as an engineering domain. The reason for this difference is that "dogs" and "cats" may be relevant to a tax deduction of pet care expenses for a pet care business, whereas in an engineering domain cats and dogs tend to be irrelevant to any of the other words in the domain.

Revised query (222) is a query that contains at least one of the alternative terms (220). Revised query (222) may contain some or none of the original query words (216). Specifically, a revised query (222) is a change from the original query by one or more words. The revised query (222) may have the same number or words or a different number of words than the original query from the user.

A boost value (252) is a number a representing the weight to be given to a word when executing a search using the search engine (209). The term "boost" means to modify the weight given to a word before the search engine (209) executes a search that includes the word. The boost value (252) may be a number equal to or less than one, but could be different values, if desirable. A larger boost value (252) represents a term to be given greater weight during a search by a computerized search engine. A lower boost value (252) represents a term to be given lesser weight during a search by a computerized search engine.

Boosted revised query (254) is revised query (222) to which one or more terms in the revised query have been assigned a boost value (252). An example of a boosted revised query (254) is given with respect to FIG. 6.

Document store (256) is one or more source documents to be searched by the search engine (209). Thus, document store (256) is one or more documents stored in data repository (202). Document store (256) may contain domain-specific documents (242), defined below. In other words, the document store (256) has the set of documents that are the target of the search.

Past queries (246) are queries generated by users and entered into the search engine UI (210), prior to run time. Past queries (246) are thus words or other alphanumeric text which were previously submitted to the search engine (209). In one or more embodiments, past queries are complete queries from a user. In one or more embodiments, past queries may be part of a query.

Past query words (244) are words or alphanumeric text that formed the past queries (246). Past query words (244) may have been modified by alternative terms to form past revised queries. However, as used herein, the terms: alternative terms (220), the revised query (222), and the boosted revised query (254) refer to aspects of the new query (206), unless stated otherwise.

Results (211) are the output of the search engine (209). Results (211) include both exact matches between terms in the revised query (222), or boosted revised query (254), and terms in the document store (256). Results (211) may also include related alternative matches between terms in the revised query (222), or boosted revised query (254), and terms in the document store (256). Results (211) may be stored in the data repository (202) for future reference with respect to building or revising any of the semantic graph data models (232). The results (211) may be the documents or links to the documents.

Domain-specific documents (242) are documents related to a specific domain. Domain-specific documents (242) are documents containing data related to a particular area of knowledge, such as but not limited to information about taxes. Domain-specific documents (242) may be stored in, for example, domain-specific database (106) of FIG. 1.

Domain words (240) are words or other alphanumeric text stored in the domain-specific documents (242). The domain words (240) thus pertain to the domain to which the domain-specific documents (242) belong.

Machine learning model (262) is program code that is the implementation of a machine learning algorithm that recognizes patterns in data. The machine learning model is trained to output a revised query based on an input of an original query. The machine learning model is trained to recognize the user's intent from the original query and create the revised query based on the user's intent. Different types of machine learning models exist, such as an unsupervised machine learning model and a supervised machine learning model. Unless otherwise indicated, as used herein, the machine learning model (262) is an unsupervised machine learning model. More particularly, the machine learning model (262) may be a shallow neural network model. However, other kinds of machine learning models may be used, such as, but not limited, to a deep neural network model.

Figure 4A:
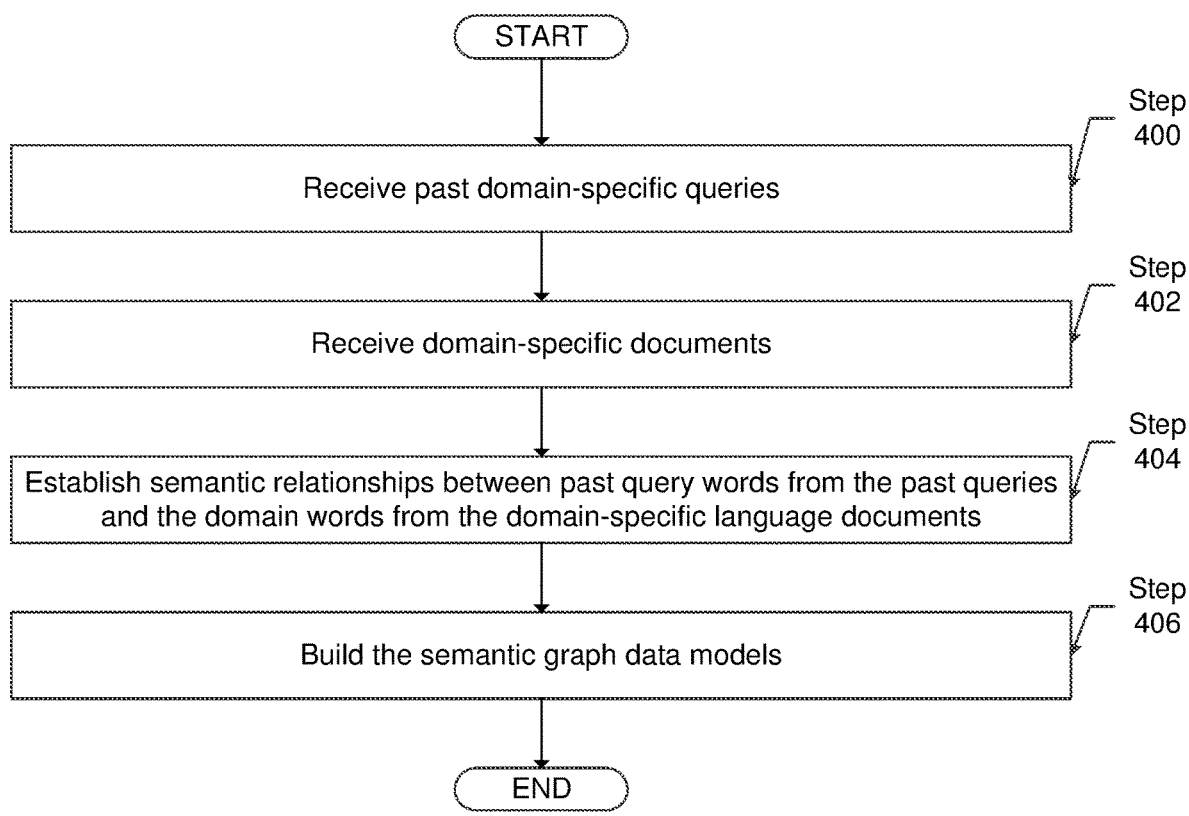
Figure 4B:
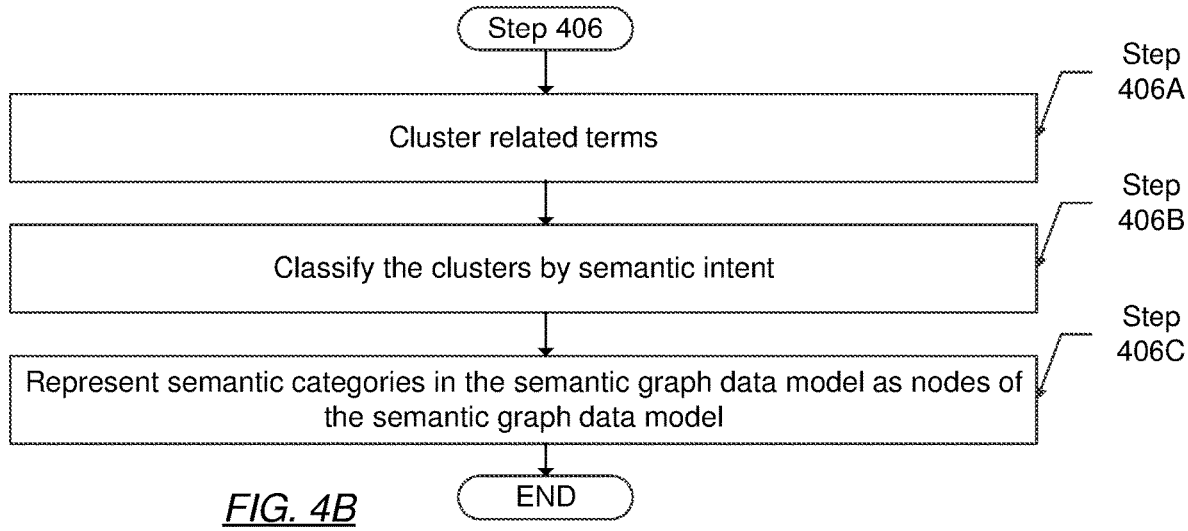
Figure 4C:
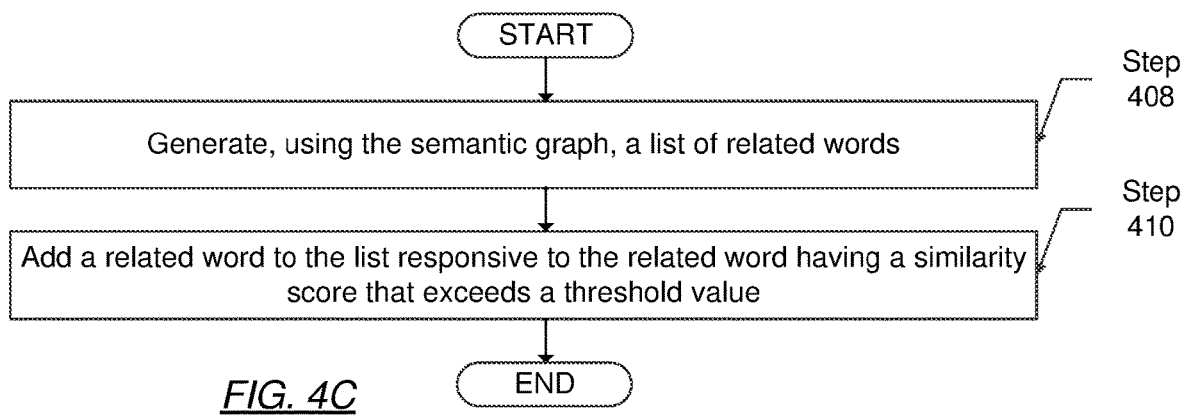

The machine learning model (262), when executed, generates a semantic graph data model, as described with respect to FIG. 4A-4C. The machine learning model (262) can be trained on a variety of data sources, including other semantic graph data models (232) and social content having non-normalized, unprecise definitions specific to the domain. Other data sources for use in training the machine learning model (262) include, but are not limited to, social media data, stored user questions related to the domain, past queries (246), United States Internal Revenue Service publications, blogs by professionals in the domain, and other domain-specific sources of text data.

Figure 5:
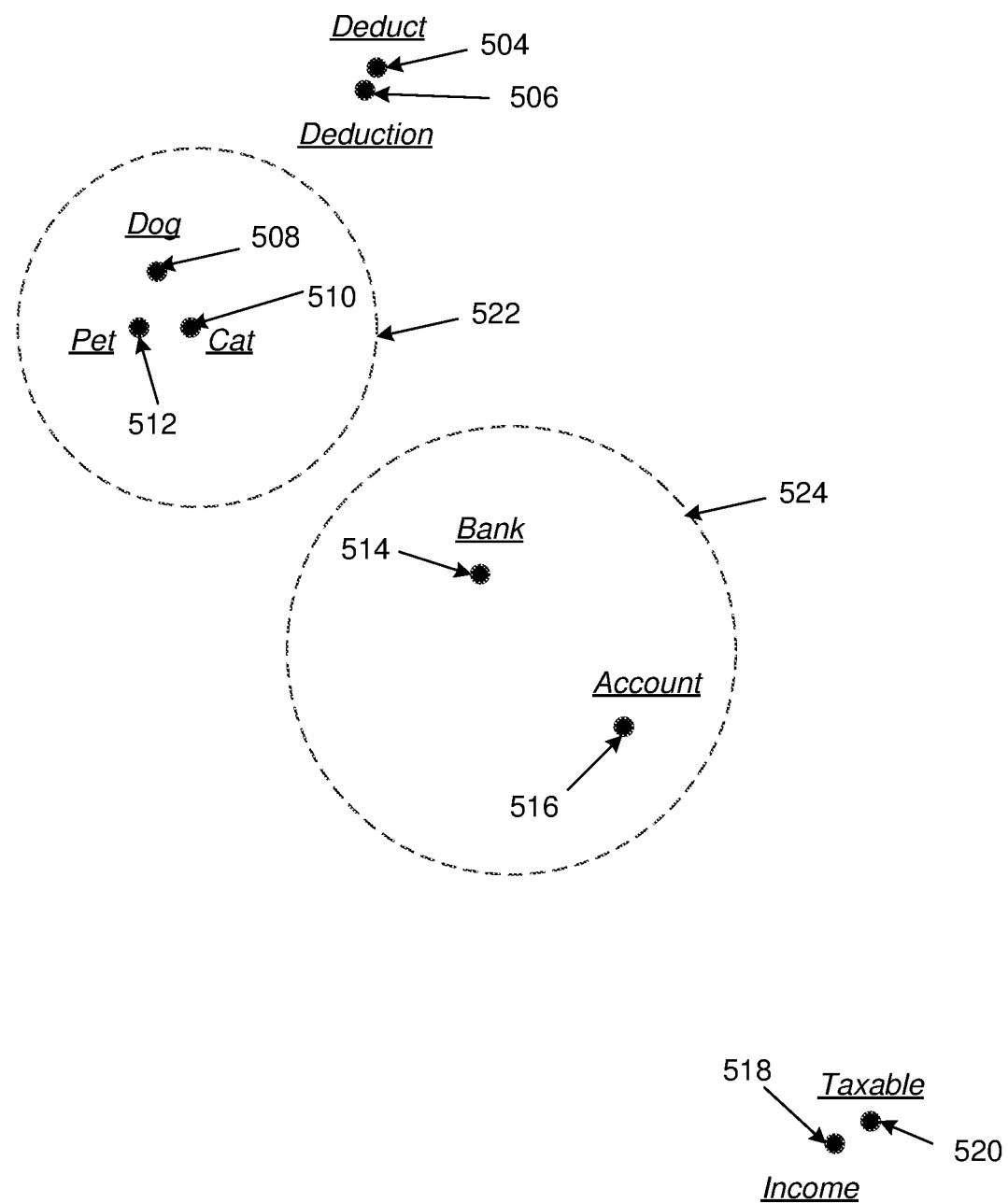
FIG. 5 depicts an example of a semantic graph data model in accordance with one or more embodiments.

Semantic graph data models (232) are quantitatively defined semantic graphs that show semantic relationships (236) among words (234), as defined further below. An example of a semantic graph data model is shown in FIG. 5. In the semantic graph data models (232), quantitatively assessed semantic relationships among words are shown by the relative distances between words in the graph.

Semantic relationships (236) are numbers that represent the semantic similarity (238) among the words (234), as defined further below. The semantic relationships (236) may be presented in one or more of the semantic graph data models (232). Once determined, the semantic relationships (236) may be stored for quick reference.

Semantic similarity (238) is the quantitative distance between words in a semantic graph data model. In one or more embodiments, semantic similarity (238) may be defined more specifically as the cosine of the angel between two word embeddings on a semantic graph data model. The term "distance" refers to a numerical difference representing a difference between data points on the semantic graph data model, such as shown in FIG. 5. A distance also may be represented by a similarity score between word pairs.

Words (234) are words used in the semantic graph data models. Words may be actual words, misspelled words, acronyms, and most generally may be alphanumeric sequences expected to be used as query words (216).

Stated differently, words (234) are semantically related based on the semantic similarity (238) of words (234). For example, "dog" and "cat" are not synonyms, but have a close semantic relationship based on both being pets. Similarly, apples, oranges, and meatballs are semantically related based on all being food, with apple and orange have a closer semantic relationship based on being fruits, relative to an apple being related to a meatball. Semantic relationships may also extend beyond categories. For example, work and income taxes may be semantically related even though work and income taxes are in different categories of items.

List (266) is a list of the alternative terms (220). The list (266) may also be referred-to as a synonym file. The list (266) may be generated using the semantic graph data models (262), as described with respect to FIG. 3A and FIG. 3B.

Pre-determined data models (230) are semantic graph data models that have been constructed prior to receipt of a new query (206) and application of the search engine preprocessing logic (212). Pre-determined data models (230) may be used by search engine preprocessing logic (212) to generate alternative terms (220) for use in a revised query (222), as described with respect to FIG. 3A-3B.

Selected data model (semantic graph data model) (224) is the data model selected for use at runtime when the search engine preprocessing logic (212) is instructed to generate the revised query (222). Use of the selected data model (224) is described with respect to FIG. 3A-3B.

Pre-determined data model (semantic graph data model) (226) and pre-determine data model (semantic graph data model) (228) are individual examples of pre-determined data models (230). Pre-determined data models (230) may include many data models, such as but not limited to pre-determine data model (226) and pre-determine data model (228). The selected data model (224) is selected from among the pre-determined data models (230).

Attention is now turned to user device (200). User device (200) is a computing system, which may be any processor-based technological device. An example user device is described with respect to FIG. 7A and FIG. 7B, which may be managed by one or more computing systems in a possibly networked environment.

The user device (200) includes a display device (204), which is configured to display information to the user, and possibly to receive input from the user. The user device (200) is configured to receive a new query (206) in the form of natural language text (208) via a search engine UI (210) displayed on the display device (204), as explained with respect to FIG. 3A-3B. Note that the user device (200) may be remote from the computing system that executes the search engine (209), or other features shown in FIG. 2.

As used herein, a new query (206) is the current query for information. The new query (206) may take the form of natural language text (208). Natural language text (208) is alphanumeric text in human-readable form, sometimes in the form of a sentence.

The search engine (209) is software or application-specific hardware in communication with the user device (200). The search engine (209) is configured to execute queries and obtain search results. For example, the search engine (209) may be configured to compare one or more of the new query (206), the revised query (222), and the boosted revised query (254) to domain-specific documents in the document store (256), as described with respect to FIG. 3A-3B.

As indicated above, the search engine (209) includes a search engine user interface (UI) (210). The search engine UI (210) is an interface for communicating with a user. For example, the UI may be a graphical UI. The UI includes UI widgets for receiving a query, such as new query (206). The UI may include functionality to display results on the display device (204) of the user device (200).

Figure 7A:
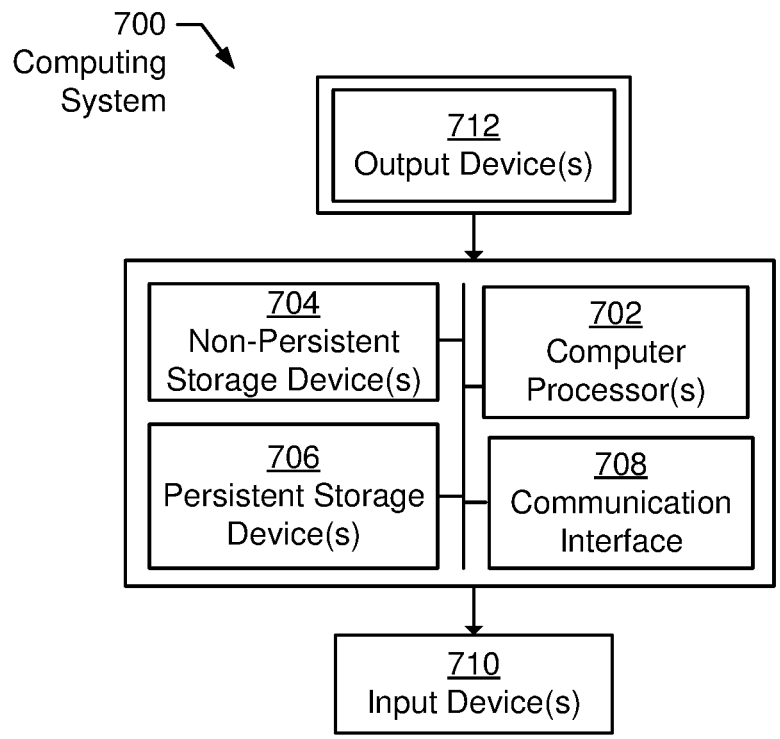
FIG. 7A and FIG. 7B depict diagrams showing a computing system, in accordance with one or more embodiments.
Figure 7B:
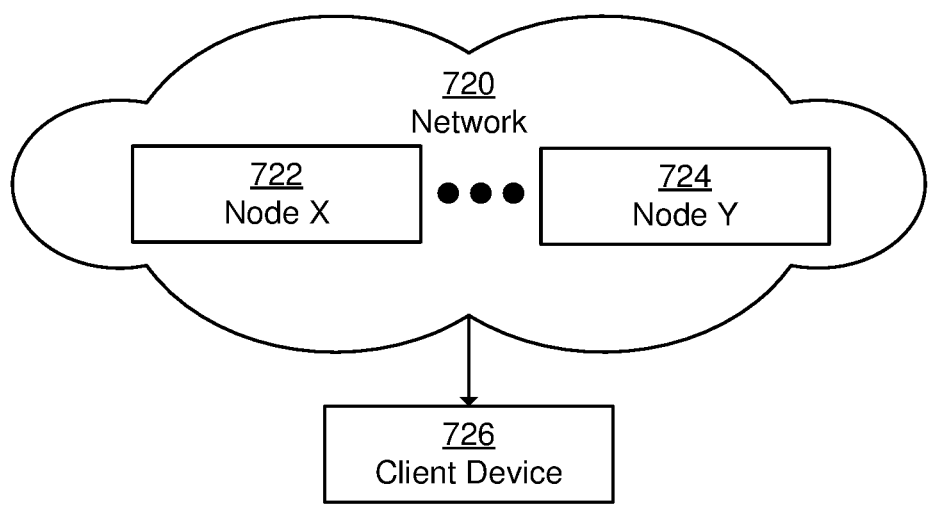

The search engine (209) and the search engine UI (210) may be maintained by a remote server, such as Node X (722) in FIG. 7B. In some embodiments, the search engine (209) and the search engine UI (210) could be maintained on the user device (210).

The computing system shown in FIG. 2 also includes search engine preprocessing logic (212). Search engine preprocessing logic (212) is software or application-specific hardware in communication with the data repository (202) and with the search engine (209). The search engine preprocessing logic (212) is configured to process the new query (206) before the search engine executes the new query (206), as described with respect to FIG. 3A-3B. The search engine preprocessing logic (212) may be a separate software program or application-specific hardware relative to the search engine (209). The search engine preprocessing logic (212) may be executed on a server relative to the user device (200), but in some cases could be instantiated on the user device (200).

The search engine preprocessing logic (212) includes a natural language extractor (214). The natural language extractor (214) is software or an application-specific hardware configured to extract data from the natural language text (208), as described with respect to FIG. 3A-3B.

The search engine preprocessing logic (212) also includes alternative term generator (218). The alternative term generator (218) is hardware or application-specific hardware. The alternative term generator (218) is configured to use a selected data model (224) to generate alternative terms (220) relative to those used in the new query (208), as described with respect to FIG. 3A-3B.

The alternative term generator (218) may include threshold values (248). The threshold values (248) are numbers that may be compared to the semantic similarity (238) between words (234) in the selected data model (224), as described with respect to FIGS. 3A and 3B. The higher the value of the threshold values (248), the less likely that a word in the words (234) is going to be selected as an alternative term among alternative terms (220).

The search engine preprocessing logic (212) also includes booster (250). The booster (250) is software or application-specific hardware. The booster (250) is configured to assign a boost value (252) to words used in the boosted revised query (254), as described with respect to FIG. 3A-3B, as well as FIG. 6.

The search engine preprocessing logic (212) also includes a list generator (264). The list generator (264) is software or application-specific hardware. The list generator is configured to receive and store the list (266) of alternative terms (220), as described with respect to FIG. 3A-3B, as well as FIG. 4A-4C.

The computing system shown in FIG. 2 also includes semantic graph data model generator (258). The semantic graph data model generator (258) is software or application-specific hardware in communication with the data repository (202). The semantic graph data model generator (258) is configured to generate one or more semantic graph data models, such as semantic graph data models (232), as described with respect to FIG. 4A-4C.

The computing system shown in FIG. 2 also includes machine learning model trainer (260). The machine learning model trainer (260) is software or application-specific hardware in communication with the data repository (202). The machine learning model trainer (260) is configured to train machine learning models, such as machine learning model (262), in the manner described with respect to FIG. 4A-4C.

The one or more embodiments contemplate adjusting for different types of users. As used herein a "type of user" is a pre-determined category of user. In one or more embodiments the pre-determined categories represent degrees of expertise in the domain, such as but not limited to "novice," "average," "advanced", and "expert." A "novice" user has little experience in the domain and is expected to use common terms as opposed to technical, domain terms. An "expert" user has a high degree of experience in the domain and is expected to use technical, domain terms. An "average" or "advanced" user has differing levels of experience in the domain in between "novice" and "expert" to a corresponding higher or lower pre-determined degree. Each of the predetermined data models (230) can correspond to one of these different types of users.

Figure 3A:
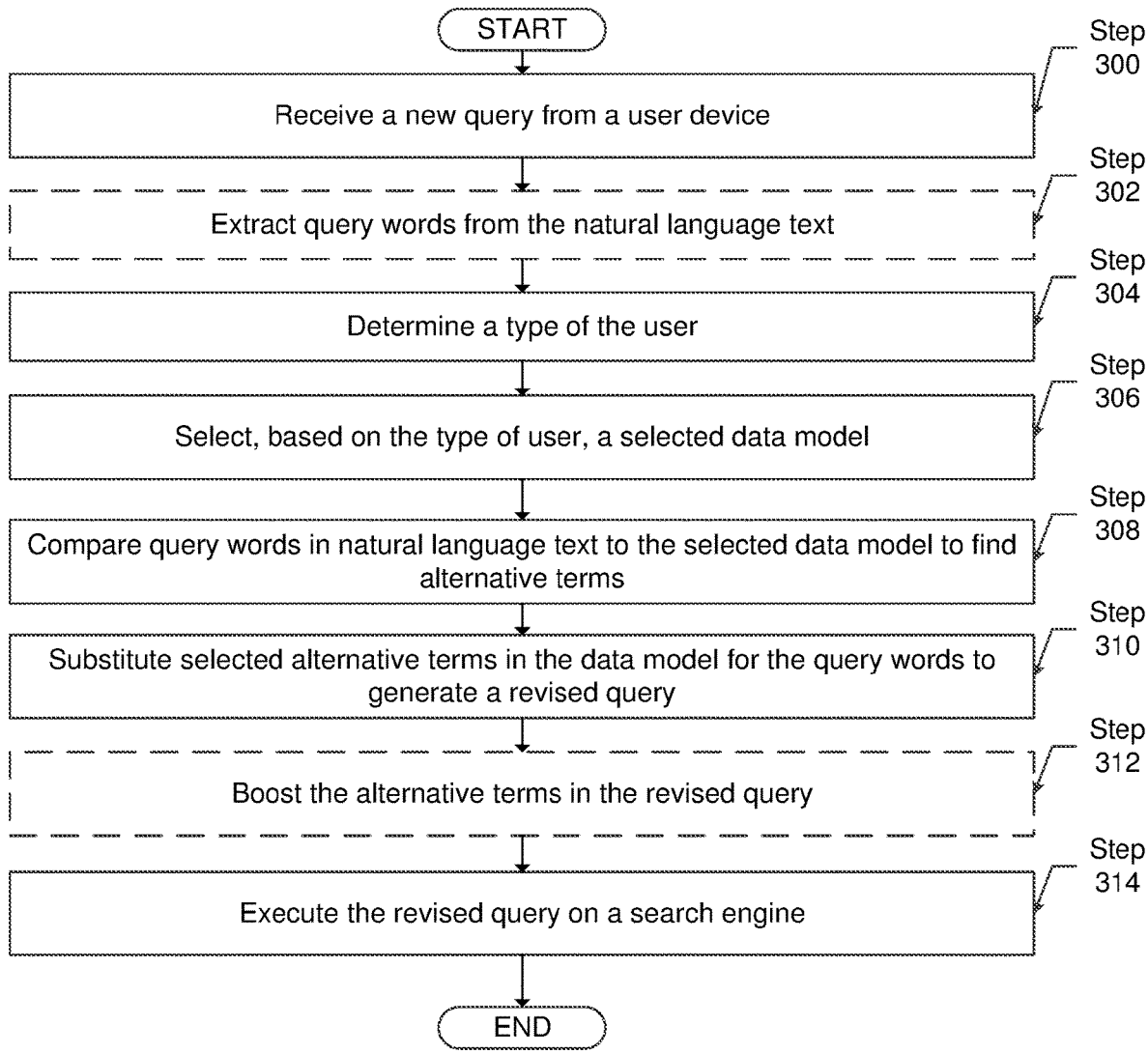
FIG. 3A, FIG. 3B, FIG. 4A, FIG. 4B, and FIG. 4C depict flowchart diagrams in accordance with one or more embodiments.
Figure 3B:
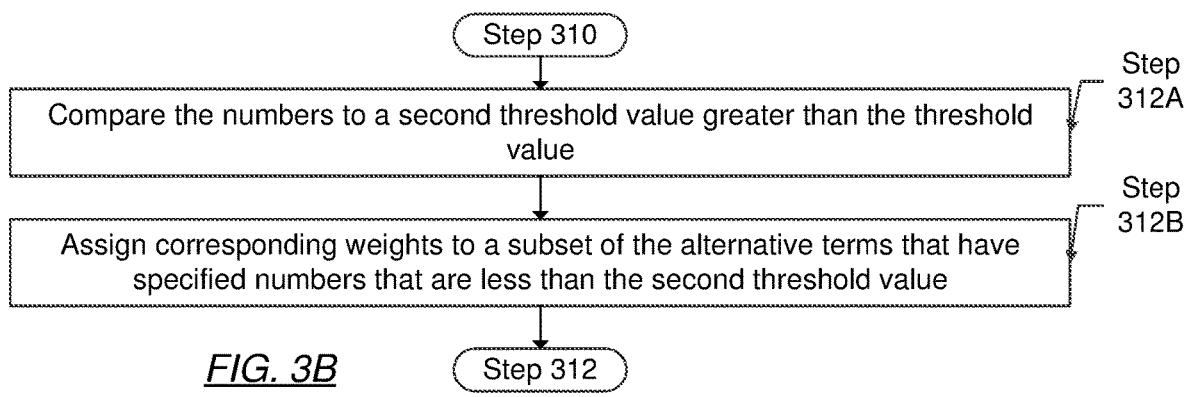

As described with respect to FIG. 3A-3B, users of different types, or levels of expertise, sometimes use different terms in their new queries (206), the one or more embodiments adjust for the difference by selecting a pre-determined data model from among the pre-determined data models (230) most likely to relate query words (216) to useful or relevant alternative terms (220) in the domain-specific documents (242). The term "most likely" is a pre-determined evaluation. The pre-determined evaluation is the result of a comparison of past queries (246) by different types of users against different data models of the semantic graph data models (232).

FIG. 3A, FIG. 3B, FIG. 4A, FIG. 4B, and FIG. 4C depict flowchart diagrams in accordance with one or more embodiments. The flowchart diagrams shown in FIG. 3A, FIG. 3B, FIG. 4A, FIG. 4B, and FIG. 4C may be characterized as a method for executing a computerized query implemented by a computer processor.

In step (300), a new query from a user device is received at a user device. Specifically, a user using an application, such as a local application or website having a browser, submits a query. The new query may contain natural language text. In optional step (302), query words are extracted from the natural language text using a natural language extractor. In other words, the query is parsed such as by using common delimiters (e.g., space) or other delimiters to extract individual words.

In step (304), a type of the user is determined. The user can be prompted to provide the user's self-assessment of the user's level of expertise.

In one or more embodiments, the query words can be used to determine a pre-determined category to which a user should be assigned. For example, if none or few of the words in the new query correspond to domain specific words, then the user may be determined to be a "novice" type of user. In this case, a pre-determined data model built for novice users is selected. In another example, if more than a threshold proportion of the words in the new query exactly match domain-specific words, then the user may be determined to be an "advanced" or higher type of user.

In one or more embodiments, in addition to real-time query analysis, there may be multiple techniques for determining user type. For example, a predictive model based on both text data and metadata (e.g., user agent, clickstream, etc.) may be used to determine user type. In another example, the type of the application be used by the user (e.g., free vs. paid software version) may be used to determine user type. In still another example, a pre-determined user profile may be used to determine user type. Other techniques are contemplated.

In step (306), a selected data model is selected from among different pre-determined data models. Selection of the data model may be performed according to one or more different rules or policies. For example, the selected data model may be selected based on the type of the user. In another example, the selected data model may be selected based on the domain to which the domain-specific documents belong. In another example, the selected model may be selected based on multiple, possibly boosted parameters, such as a combination of the type of user, the type of the domain, and/or the type of the domain-specific documents. By selecting a specific data model tailored to a particular domain and/or user type, as opposed to using a generic data model, the one or more embodiments are more likely to generate alternative terms that are closer in meaning to the user's intent. Thus, the one or more embodiments provide instructions for allowing a computer to generate a revised query that, when executed, better captures the user's intent.

In step (308), the query words are compared to the selected data model using the alternative term generator to find alternative terms. An alternative term is selected from the selected data model if the semantic relationship (semantic similarity) between a query word and a candidate alternative term in the semantic graph data model exceeds a threshold value.

In another embodiment, when a pre-existing list of alternative terms has already been generated, step (308) may be changed. In this case, step (308) is replaced by the step of substituting alternative terms in the list for the query words. Use of the list may increase the speed of the search engine pre-processing logic.

In still another embodiment, one or more of the original query words may be selected for use. For example, when the original query word exactly matches a domain-specific word, then the original query word may be selected as part of the revised query.

In step (310), the selected alternative terms from the data model are substituted for the query words to generate a revised query. The substitution is performed using search engine pre-processing logic. Substitution may be performed by overwriting an original query word with an alternative term.

In step (314), the revised query is executed on a search engine using the alternative terms. When executing a search, the search engine compares the revised query to terms used in domain-specific documents in a document store. The search engine then returns a result. The result is a list of domain-specific documents, or references within domain-specific documents, that may contain the information being sought. The result may be displayed on the user device. Because the result is based on a revised query or boosted revised query, the result is more likely to contain references to domain documents or data within the domain documents which actually answers the question intended by the user.

The method of FIG. 3A may terminate thereafter. However, the method of claim 1 may be varied.

For example, one or more optional steps may be inserted into the method of FIG. 3A. In optional step (312), the alternative terms in the revised query may be boosted. Boosting may be performed after substituting and prior to executing. The revised query is modified by the boosting to form a boosted revised query that is used in place of the revised query when executing on the search engine.

In this case, step (312) of FIG. 3A may be further modified as shown in the method of FIG. 3B. Thus, for example, in step (312A), boosting may include comparing the numbers to a second threshold value greater than the threshold value. Then, in step (312B), corresponding boost values are assigned to a subset of the alternative terms that have specified numbers that are less than the second threshold value.

Alternatively, step (312B) could be replaced with assigning corresponding boost values to a subset of alternative terms proportionally according to the semantic relationships. In this case, the method may also include assigning boost values to ones of a subset of alternative terms based on unsupervised learning performed on past user queries to find terms that are related. The terms are determined by the unsupervised machine learning to be more closely related receive higher boost values.

Attention is now turned to FIG. 4A through FIG. 4C, which relate to a method for building a semantic graph data model useful in the method of FIG. 3A. It is possible that the methods shown in FIG. 4A through FIG. 4C are performed as part of the method of FIG. 3A, such as before step (300). Accordingly, FIG. 4A may be characterized as a method of building the pre-determined data models from which the selected data model is chosen, as mentioned in step (304) of FIG. 3A. However, FIG. 4A may also stand as its own method in one or more embodiments.

Referencing FIG. 4A, in step (400), past domain-specific queries are received. The past domain-specific queries may be received from stored queries generated by users of a specified type. By limiting the past domain-specific queries to the users of a specified type, a data model is trained specifically for the specified type of user. In step (402), the domain-specific documents are received. The domain-specific documents may be from among those of interest to the user, regardless of the type of user. Together, the past domain-specific queries and the domain-specific documents form an input.

In step (404), semantic relationships are established between the words from the past queries and the domain words from the domain-specific language documents. Establishing is performed by an unsupervised machine learning model operating on the input to correlate a given word in the words to other words in the domain words. Establishing may further include determining semantic similarity between the given word and the other words.

In step (406), the semantic graph data models are built using the semantic similarity. Building the semantic graph data model may be performed using a machine learning algorithm operating on a machine learning model that has been trained using the input referenced in step (402) and step (404). Building the semantic graph data model may also be performed according to the method shown in FIG. 4B.

For example, in step (406A) of FIG. 4B, building the semantic graph data model may include clustering related terms by the distances into clusters. In step (406B), the clusters may be classified according to corresponding semantic intents of the clusters. Semantic intent is defined as word as being within a pre-determined semantic relationship of an abstract word of which the other words are an example of the abstract word. For example, the word "pet" may be an abstract word which form a cluster with the words "dog" and "cat" (examples of "pet" because "dog" and "cat" are both within a pre-determined semantic relationship of the word "pet." In step (406C), semantic categories in the semantic graph data model are represented as nodes of the semantic graph data model.

Yet other variations are possible. For example, FIG. 4C expands on the method shown in FIG. 4A. In step (408), a list of related words related to a selected word is generated using the selected semantic graph data model. In step (410), a related word is added to the list responsive to the related word having a similarity score, relative to the selected word, that exceeds a threshold value. In this manner, the list (266) described in FIG. 2 may be generated.

Still other variations are possible. Thus, the examples described with respect to FIG. 3A through FIG. 4C may be further varied and do not necessarily limit the claimed inventions or the other examples provided herein.

FIG. 5 depicts an example of a semantic graph data model in accordance with one or more embodiments. In one or more embodiments, a graph database is a database that uses graph structures for semantic queries where nodes, links, and properties are used to represent and store data. Accordingly, the graph structure is used to select a configuration data item in response to a query from an adopting user. The selected configuration data item is then used to configure the software solution for the adopting user without requiring the adopting user to generate any additional configuration data item.

A semantic graph data model may include many different words (e.g., hundreds in the section shown), but for purposes of the example and readability, only nine words are present: "Deduct" (504), "Deduction" (506), "Dog" (508), "Cat" (510), "Pet" (512), "Bank" (514), "Account" (516), "Income" (518), and "Taxable" (520). Each word in the semantic graph data model has a distance to every other word in the semantic graph data model, as determined by the difference in the coordinates of the words.

Words that are closer together are considered more semantically related relative to words that are farther apart. Thus, for example, the word "Deduct" (504) is most highly correlated with "Deduction" (506). As another example, the semantic similarity between "Deduct" (504) and "Deduction" (506) is greater than the semantic similarity between "Pet" (512) and "Dog" (508), because the distance between "Pet" (512) and "Dog" (508) is greater than the distance between "Deduct" (504) and "Deduction" (506).

The words shown in the semantic graph data model of FIG. 5A may be organized into clusters, such as cluster (522) and cluster (524). A cluster is defined as a group of words in a semantic graph data model that are within a pre-selected distance of each other. Because the pre-selected distance used to define a cluster may be changed, depending on how broadly a search is to be performed, clusters can vary in size. For example, cluster (524) is larger than cluster (522). Organizing words into clusters does not change their semantic similarity with respect to each other; rather, the distance between words determines their semantic similarity.

The semantic graph data model of FIG. 5 may be constructed by a variety of means. For example, one could use a pre-existing program such as "word2vec" or a vector graph that denoted semantic similarity between words. CBOW (Continuous Bag of Words) and Skipgrams may be used as the building algorithm, and AMAZON SAGEMAKER® may be used to build the model. Other forms of cloud computing could be used, such as but not limited to Microsoft Azure and other related services. The semantic relationship model of FIG. 5 is translated into a custom data structure that holds the model. That way, one may query the semantic graph data model during search time to get the words around a query word.

There are several approaches where the semantic graph data model of FIG. 5 could be useful. One is in an online classification of query. In this case, each cluster can be tagged with an intent. For example, cluster (524) with words like "Bank" (514) and "Account" (516) can be tagged as a cluster representing a finance intent. Thus, if the query has the word "Account", one could query the semantic graph data model of FIG. 5A to see which words and tags are around the word "Account", which in this case is "Bank" (514). Accordingly, the query word "Account" can be tagged with a "finance" intent.

Another use of the semantic graph data model of FIG. 5A is for a booster, such as booster (250) of FIG. 2, to find semantically related words for a query word and to determine boost values for the synonyms. Again, a query word can be associated with a cluster in order to identify an intent of the query word. If the query is "Instructions to amend taxes", querying the model may identify the word 'steps' as being within the intent, which could be used to rewrite the query as "Steps to amend taxes". Based on how far the synonym is from the original word, a boost value could be assigned to the substituted word. The farther the substituted word is from the query word on the semantic graph data model, the less the importance of the word, and hence the lower the boost value.

Figure 6:
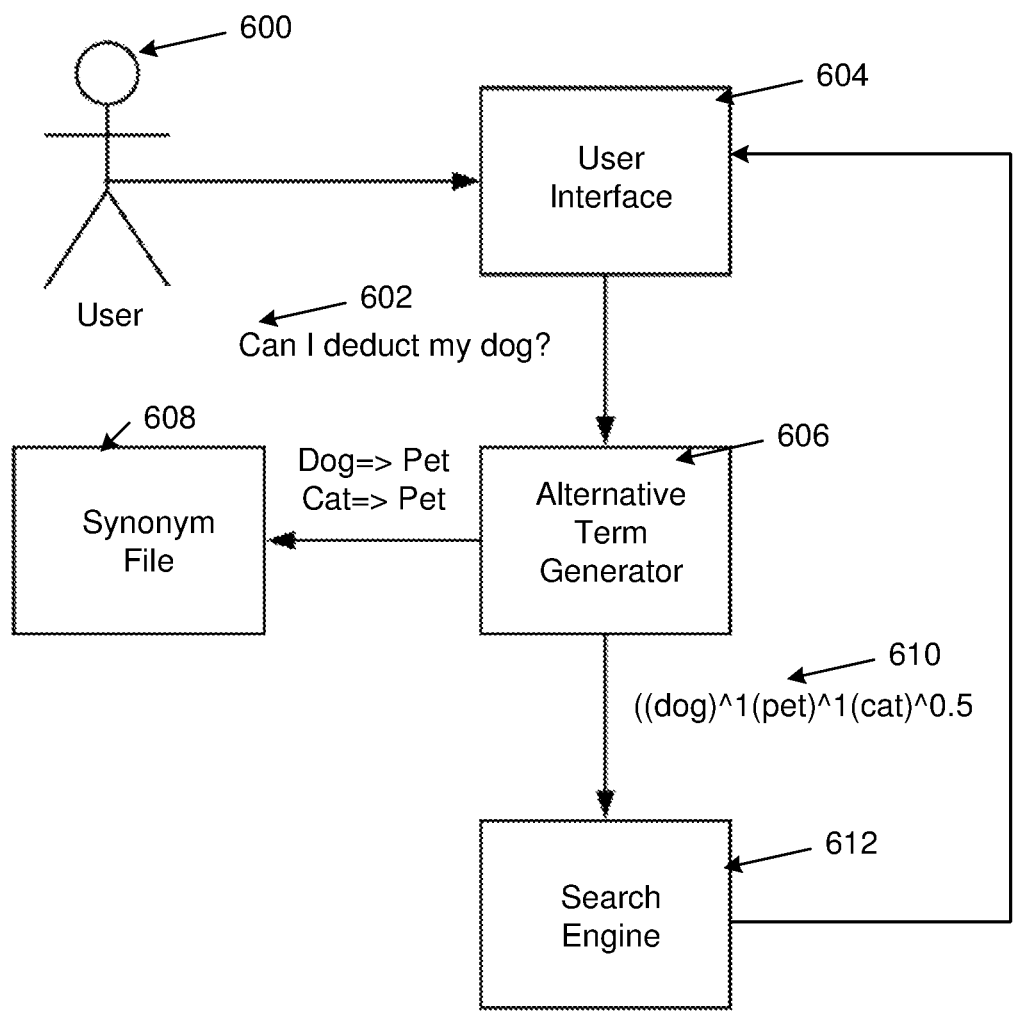
FIG. 6 depicts a schematic diagram of a use case in accordance with one or more embodiments.

FIG. 6 depicts a schematic diagram of a use case in accordance with one or more embodiments. The example shown in FIG. 6 is meant only as a specific embodiment, and thus does not limit the other examples described herein.

In the example of FIG. 6 the user (600) is preparing his or her tax returns. The user (600) is looking for as many legal deductions to his taxable income; however, the user (600) is a novice in tax law. In this example, an idea occurs to the user (600): that perhaps expenses related to taking care of his or her dog might be an allowable deduction to his or her taxable income. However, the user (600) wants to be sure that such a deduction is legal, and so the user turns to a search engine to confirm or refute the idea.

Thus, user (600) inputs query (602) into user interface (604). In this example, the user (600) inputs the following natural language query into the user interface (604): "Can I deduct my dog". Before executing a search on the query, the alternative term generator (606) (which may be part of pre-processing logic) uses a natural language extractor to extract words from the natural language query. In an embodiment, all words in the query are compared to possible substitute terms. In another embodiment, only words identified as being unusual are compared to possible substitute terms ("unusual" meaning that the word appears fewer than a threshold number of times in the tax documents). In this example, the word "dog" is identified as being unusual in the tax documents.

The alternative term generator (606) compares the word "dog" to synonym file (608). Alternatively, use the synonym file (608) may be replaced by comparison of the term "dog" to a semantic graph data model, such as that shown in FIG. 5, to find an alternative term. In either case, the alternative term generator (606) determines that there are several words close in semantic meaning to the word "dog", such as the word "Pet" and the word "Cat" (because a cat and a dog are both pets).

The word "cat" has a lower correlation to the word "dog" than the word "pet". However, inclusion of the word "cat" can increase recall when the revised query is processed by the search engine, and thus is added to the search even though a "cat" is not a "dog".

In view of the above, the alternative term generator (606) assigns a boost value of "1" to the word "dog", a boost value of "1" to the word "pet" and a boost value of "0.5" to the word "cat". A boost value of 1 means that the term is given full weight when performing a search, but a boost value of 0.5 means that the word "cat" is given less importance when performing a search. The alternative term generator (606) thus substitutes the term "dog" from the original query with the concatenated boosted search term (610), "((dog)^1(pet)^1(cat)^0.5)". The boosted search term, which also may be referred-to as a "revised query" or "boosted revised query", is provided to the search engine (612).

The search engine (612) then executes the search using the revised search input. The results of the search are then provided back to the user interface (604) for review by the user. The results of the revised input is more likely to return relevant information to the user. The results are improved because the determination of the semantic meaning of the word "dog", in the context of the natural language sentence, teaches the computing system to behave more like a human being when determining what the user (600) meant by the original query. In other words, through the technical techniques described herein, the search engine (612) is enabled perform a search that is closer to how a tax expert would input a search query into a search engine.

In an embodiment, the synonyms, at index time, are based on field types. Each time the indexer encounters a token in the synonym file the indexer adds the appropriate response. The filed type may have the synonym file referenced using, in a specific non-limiting example, the following pseudo-code:

<fieldType name="text_stemmed_synonym_en" class="solr.TextField" positionIncrementGap="100">
<analyzer type="index">
<filter class="solr.SynonymGraphFilterFactory"
synonyms="lang/synonyms_en.txt" ignoreCase="true" expand="true"/>
</analyzer>
</fieldType>

In this example, "Solr" refers Apache SOLR® platform, which is an open source enterprise search platform built on APACHE® LUCENE® search software.

While custom boosting one synonym term more than another may not be possible when using SOLR® platform, a graph filter may still be applied by creating a new field and only adding synonyms to the new field. The boost on the new field can then be changed to a different value.

Attention is now turned to an alternative example of the issues addressed by the one or more embodiments, and the techniques that address the issues. At a high level, the disclosed embodiments combine the extraction of semantic relationships from customer data using shallow neural networks and assimilation of semantic relationships by a search engine.

Domain specific semantic search, social question answering (SQA), in-product navigation and conversational user interfaces (CUI) use a substantial degree of customization to deliver personalized user experiences. For example, a search engine used to find tax information may use a tax specific semantic knowledge bases that are hard coded and should be tested (for example, by computing discounted cumulative gain (DCG) scores offline or with testing in a production environment). Note that, in general, any type of self-help in tax and finance software applications can be customized. Before the present disclosure, the whole process was largely manual and labor intensive.

One issue addressed by the one or more embodiments is that existing approaches to generation, maintenance and curation of domain specific semantic relationships (also ontologies, stop word and misspelling lists, and semantic mappings) for SQA, semantic search, and CUI were not scalable. Thus, the one or more embodiments provide for automated generation of semantic relationships from unstructured (text) data collected from prior users of the search engine, which is scalable.

Another issue addressed by the one or more embodiments is that lack of automation makes difficult the process of personalizing semantic relationships as part of a search and navigation experience. Thus, the one or more embodiments provide for (1) creating personalized semantic relationships based on domain specific artifacts (e.g. IRS publications in a tax domain), and (2) domain specific vernacular language dictionaries and semantic mappings (e.g. query extensions for search engines) based on query, utterance, and question writing styles.

Attention is now turned to the details of these techniques. In particular, attention is first turned to the semantic relationship models.

The one or more embodiments may be based on (unsupervised) machine learned semantic relationships, and is therefore fully scalable. The one or more embodiments provide substantial cost and time savings relative to the manual and labor intensive techniques, and improve the overall quality of user generated content, SQA, semantic search, and CUI user experiences.

The one or more embodiments provide for machine learnt domain specific word-to-word relationships (e.g. synonyms, hyponyms, hypernyms, etc.) and common misspellings based on word embeddings, all stored in a semantic relationship model. The semantic relationship model is used for query extension and for matching search queries to the user and domain specific content. For example, a semantic similarity of "prior" and "previous" in prior user searches is 0.99. In another example, the semantic similarity of "recurring" and "reocurring" (i.e. misspelled form of "recurring") in prior searches is 0.94.

Attention is now turned to training the machine learning model. The data used for model training may include past user queries, and domain specific databases. For example, in a tax domain the data used for training the machine learning model may include some or all of: past user queries to a tax database, IRS publications, tax-related court decisions, tax statutes, scholarly papers on tax issues, and other domain related documents. The machine learning model also be trained to separate such content sources.

Multiple machine learning data models may be trained on different sets of data. For example, queries from novice users in conjunction with domain-specific documents can be used to train one model, and queries from expert users in conjunction with domain-specific documents can be used to train another model.

Once trained, a machine learning model can be used to produce a semantic graph, also known as a semantic graph data model. The semantic graph is built using semantic similarity scores and used for personalized faceted search and navigation. The semantic graph data model may represent concepts as nodes of a directed acyclic graph. Multiple semantic graph data models may be produced using multiple machine learning models, in order to accommodate users of differing expertise.

Thus, the one or more embodiments provide for a technique for producing a machine learning model useable by an alternative term generator for generating alternative terms which may be input into a search engine. In addition, the one or more embodiments also provide for personalized query extensions.

Users searching using a domain-specific search engine may belong to different demographic groups and use different language. Thus, the semantic relationships are therefore extracted from multiple sets of data, as described above. The models then trigger query extensions specific for the domain-specific search engine.

A user who is known, or identified, to prefer vernacular language will receive search results that are user generated and include vernacular language and vice versa. Thus, the one or more embodiments provide answers which a user is more likely to deem both relevant and understandable.

The one or more embodiments have been implemented in experimental cases only, and the experimental results are described below. The following semantic relationship models have been trained using the following approaches.

An Amazon SAGEMAKER® BLAZINGTEXT® algorithm was built with custom built code to read the content text data. In general, one can use any convenient implementation of a word embedding algorithm. In addition, a PYTHON® gensim package with and without stemming was built to reproduce the effects of a LUCENE® SNOW- BALL® filter. The "gensim" package included word2vec, doc2ved, and other word embedding algorithms, but natural language processing (e.g., stemming) is done by other PYTHON® packages, for example, by a natural language processing toolkit (NLTK).

Thus, the one or more embodiments provide for the use of vernacular language in the data used to train the machine learning models that produce the semantic graph data models used at run time. The one or more embodiments are capable of assimilating semantic relationships from both normal and vernacular languages. For example, a user may search content using a tax domain-specific search engine by entering the query "filing without my wife" and the search engine would return documents about "married filing separately". Similarly, the semantic graph data model created by the techniques described herein is capable of detecting most common misspellings and adding the common misspellings to synonym lists which may be used to substitute terms in the entered query.

In the tax domain in particular, the one or more embodiments also provide for extracting semantic relationships for the federal and state tax forms. In fact, generic word embeddings (e.g. GOOGLE® WORD2VEC® or GLOVES® or FACEBOOK® FASTEXT®) do not capture semantic relationships between tax forms and related semantic concepts. The disclosed embodiments, however, are capable of automatically generating types of relationships (e.g. "self-employed" and "1099-MISC"). Note that this type of semantic relationships (e.g., tax forms to words) are not captured by generic pre-trained word embeddings like GOOGLE® WORD2VEC® or GLOVES® or FACEBOOK® FASTEXT®.

Finally, the one or more embodiments are SQA-specific. Thus, a social network support platform (for providing questions and answers online in the domain) allows validation of a semantic graph data model by means of social computing by trusted users. Therefore, again, the one or more embodiments are fully scalable.

Embodiments of the invention may be implemented on a computing system. Any combination of mobile, desktop, server, router, switch, embedded device, or other types of hardware may be used. For example, as shown in FIG. 7A, the computing system (700) may include one or more computer processors (702), non-persistent storage (704) (e.g., volatile memory, such as random access memory (RAM), cache memory), persistent storage (706) (e.g., a hard disk, an optical drive such as a compact disk (CD) drive or digital versatile disk (DVD) drive, a flash memory, etc.), a communication interface (712) (e.g., Bluetooth interface, infrared interface, network interface, optical interface, etc.), and numerous other elements and functionalities.

The computer processor(s) (702) may be an integrated circuit for processing instructions. For example, the computer processor(s) may be one or more cores or micro-cores of a processor. The computing system (700) may also include one or more input devices (710), such as a touchscreen, keyboard, mouse, microphone, touchpad, electronic pen, or any other type of input device.

The communication interface (712) may include an integrated circuit for connecting the computing system (700) to a network (not shown) (e.g., a local area network (LAN), a wide area network (WAN) such as the Internet, mobile network, or any other type of network) and/or to another device, such as another computing device.

Further, the computing system (700) may include one or more output devices (708), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (702), non-persistent storage (704), and persistent storage (706). Many different types of computing systems exist, and the aforementioned input and output device(s) may take other forms.

Software instructions in the form of computer readable program code to perform embodiments of the invention may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that, when executed by a processor(s), is configured to perform one or more embodiments of the invention.

The computing system (700) in FIG. 7A may be connected to or be a part of a network. For example, as shown in FIG. 7B, the network (720) may include multiple nodes (e.g., node X (722), node Y (724)). Each node may correspond to a computing system, such as the computing system shown in FIG. 7A, or a group of nodes combined may correspond to the computing system shown in FIG. 7A. By way of an example, embodiments of the invention may be implemented on a node of a distributed system that is connected to other nodes. By way of another example, embodiments of the invention may be implemented on a distributed computing system having multiple nodes, where each portion of the invention may be located on a different node within the distributed computing system. Further, one or more elements of the aforementioned computing system (700) may be located at a remote location and connected to the other elements over a network.

Although not shown in FIG. 7B, the node may correspond to a blade in a server chassis that is connected to other nodes via a backplane. By way of another example, the node may correspond to a server in a data center. By way of another example, the node may correspond to a computer processor or micro-core of a computer processor with shared memory and/or resources.

The nodes (e.g., node X (722), node Y (724)) in the network (720) may be configured to provide services for a client device (726). For example, the nodes may be part of a cloud computing system. The nodes may include functionality to receive requests from the client device (726) and transmit responses to the client device (726). The client device (726) may be a computing system, such as the computing system shown in FIG. 7A. Further, the client device (726) may include and/or perform all or a portion of one or more embodiments of the invention.

The computing system or group of computing systems described in FIGS. 7A and 7B may include functionality to perform a variety of operations disclosed herein. For example, the computing system(s) may perform communication between processes on the same or different system. A variety of mechanisms, employing some form of active or passive communication, may facilitate the exchange of data between processes on the same device. Examples representative of these inter-process communications include, but are not limited to, the implementation of a file, a signal, a socket, a message queue, a pipeline, a semaphore, shared memory, message passing, and a memory-mapped file. Further details pertaining to a couple of these non-limiting examples are provided below.

Based on the client-server networking model, sockets may serve as interfaces or communication channel endpoints enabling bidirectional data transfer between processes on the same device. Foremost, following the client-server networking model, a server process (e.g., a process that provides data) may create a first socket object. Next, the server process binds the first socket object, thereby associating the first socket object with a unique name and/or address. After creating and binding the first socket object, the server process then waits and listens for incoming connection requests from one or more client processes (e.g., processes that seek data). At this point, when a client process wishes to obtain data from a server process, the client process starts by creating a second socket object. The client process then proceeds to generate a connection request that includes at least the second socket object and the unique name and/or address associated with the first socket object. The client process then transmits the connection request to the server process. Depending on availability, the server process may accept the connection request, establishing a communication channel with the client process, or the server process, busy in handling other operations, may queue the connection request in a buffer until server process is ready. An established connection informs the client process that communications may commence. In response, the client process may generate a data request specifying the data that the client process wishes to obtain. The data request is subsequently transmitted to the server process. Upon receiving the data request, the server process analyzes the request and gathers the requested data. Finally, the server process then generates a reply including at least the requested data and transmits the reply to the client process. The data may be transferred, more commonly, as datagrams or a stream of characters (e.g., bytes).

Shared memory refers to the allocation of virtual memory space in order to substantiate a mechanism for which data may be communicated and/or accessed by multiple processes. In implementing shared memory, an initializing process first creates a shareable segment in persistent or non-persistent storage. Post creation, the initializing process then mounts the shareable segment, subsequently mapping the shareable segment into the address space associated with the initializing process. Following the mounting, the initializing process proceeds to identify and grant access permission to one or more authorized processes that may also write and read data to and from the shareable segment. Changes made to the data in the shareable segment by one process may immediately affect other processes, which are also linked to the shareable segment. Further, when one of the authorized processes accesses the shareable segment, the shareable segment maps to the address space of that authorized process. Often, only one authorized process may mount the shareable segment, other than the initializing process, at any given time.

Other techniques may be used to share data, such as the various data described in the present application, between processes without departing from the scope of the invention. The processes may be part of the same or different application and may execute on the same or different computing system.

Rather than or in addition to sharing data between processes, the computing system performing one or more embodiments of the invention may include functionality to receive data from a user. For example, in one or more embodiments, a user may submit data via a graphical user interface (GUI) on the user device. Data may be submitted via the graphical user interface by a user selecting one or more graphical user interface widgets or inserting text and other data into graphical user interface widgets using a touchpad, a keyboard, a mouse, or any other input device. In response to selecting a particular item, information regarding the particular item may be obtained from persistent or non-persistent storage by the computer processor. Upon selection of the item by the user, the contents of the obtained data regarding the particular item may be displayed on the user device in response to the user's selection.

By way of another example, a request to obtain data regarding the particular item may be sent to a server operatively connected to the user device through a network. For example, the user may select a uniform resource locator (URL) link within a web client of the user device, thereby initiating a Hypertext Transfer Protocol (HTTP) or other protocol request being sent to the network host associated with the URL. In response to the request, the server may extract the data regarding the particular selected item and send the data to the device that initiated the request. Once the user device has received the data regarding the particular item, the contents of the received data regarding the particular item may be displayed on the user device in response to the user's selection. Further to the above example, the data received from the server after selecting the URL link may provide a web page in Hyper Text Markup Language (HTML) that may be rendered by the web client and displayed on the user device.

Once data is obtained, such as by using techniques described above or from storage, the computing system, in performing one or more embodiments of the invention, may extract one or more data items from the obtained data. For example, the extraction may be performed as follows by the computing system in FIG. 7A. First, the organizing pattern (e.g., grammar, schema, layout) of the data is determined, which may be based on one or more of the following: position (e.g., bit or column position, Nth token in a data stream, etc.), attribute (where the attribute is associated with one or more values), or a hierarchical/tree structure (consisting of layers of nodes at different levels of detail-such as in nested packet headers or nested document sections). Then, the raw, unprocessed stream of data symbols is parsed, in the context of the organizing pattern, into a stream (or layered structure) of tokens (where each token may have an associated token "type").

Next, extraction criteria are used to extract one or more data items from the token stream or structure, where the extraction criteria are processed according to the organizing pattern to extract one or more tokens (or nodes from a layered structure). For position-based data, the token(s) at the position(s) identified by the extraction criteria are extracted. For attribute/value-based data, the token(s) and/or node(s) associated with the attribute(s) satisfying the extraction criteria are extracted. For hierarchical/layered data, the token(s) associated with the node(s) matching the extraction criteria are extracted. The extraction criteria may be as simple as an identifier string or may be a query presented to a structured data repository (where the data repository may be organized according to a database schema or data format, such as XML).

The extracted data may be used for further processing by the computing system. For example, the computing system of FIG. 7A, while performing one or more embodiments of the invention, may perform data comparison. Data comparison may be used to compare two or more data values (e.g., A, B). For example, one or more embodiments may determine whether A>B, A=B, A !=B, A<B, etc. The comparison may be performed by submitting A, B, and an opcode specifying an operation related to the comparison into an arithmetic logic unit (ALU) (i.e., circuitry that performs arithmetic and/or bitwise logical operations on the two data values). The ALU outputs the numerical result of the operation and/or one or more status flags related to the numerical result. For example, the status flags may indicate whether the numerical result is a positive number, a negative number, zero, etc. By selecting the proper opcode and then reading the numerical results and/or status flags, the comparison may be executed. For example, in order to determine if A>B, B may be subtracted from A (i.e., A−B), and the status flags may be read to determine if the result is positive (i.e., if A>B, then A−B>0). In one or more embodiments, B may be considered a threshold, and A is deemed to satisfy the threshold if A=B or if A>B, as determined using the ALU. In one or more embodiments of the invention, A and B may be vectors, and comparing A with B requires comparing the first element of vector A with the first element of vector B, the second element of vector A with the second element of vector B, etc. In one or more embodiments, if A and B are strings, the binary values of the strings may be compared.

The computing system in FIG. 7A may implement and/or be connected to a data repository. For example, one type of data repository is a database. A database is a collection of information configured for ease of data retrieval, modification, re-organization, and deletion. Database Management System (DBMS) is a software application that provides an interface for users to define, create, query, update, or administer databases.

The user, or software application, may submit a statement or query into the DBMS. Then the DBMS interprets the statement. The statement may be a select statement to request information, update statement, create statement, delete statement, etc. Moreover, the statement may include parameters that specify data, or data container (database, table, record, column, view, etc.), identifier(s), conditions (comparison operators), functions (e.g. join, full join, count, average, etc.), sort (e.g. ascending, descending), or others. The DBMS may execute the statement. For example, the DBMS may access a memory buffer, a reference or index a file for read, write, deletion, or any combination thereof, for responding to the statement. The DBMS may load the data from persistent or non-persistent storage and perform computations to respond to the query. The DBMS may return the result(s) to the user or software application.

The computing system of FIG. 7A may include functionality to present raw and/or processed data, such as results of comparisons and other processing. For example, presenting data may be accomplished through various presenting methods. Specifically, data may be presented through a user interface provided by a computing device. The user interface may include a GUI that displays information on a display device, such as a computer monitor or a touchscreen on a handheld computer device. The GUI may include various GUI widgets that organize what data is shown as well as how data is presented to a user. Furthermore, the GUI may present data directly to the user, e.g., data presented as actual data values through text, or rendered by the computing device into a visual representation of the data, such as through visualizing a data model.

For example, a GUI may first obtain a notification from a software application requesting that a particular data object be presented within the GUI. Next, the GUI may determine a data object type associated with the particular data object, e.g., by obtaining data from a data attribute within the data object that identifies the data object type. Then, the GUI may determine any rules designated for displaying that data object type, e.g., rules specified by a software framework for a data object class or according to any local parameters defined by the GUI for presenting that data object type. Finally, the GUI may obtain data values from the particular data object and render a visual representation of the data values within a display device according to the designated rules for that data object type.

Data may also be presented through various audio methods. In particular, data may be rendered into an audio format and presented as sound through one or more speakers operably connected to a computing device.

Data may also be presented to a user through haptic methods. For example, haptic methods may include vibrations or other physical signals generated by the computing system. For example, data may be presented to a user using a vibration generated by a handheld computer device with a predefined duration and intensity of the vibration to communicate the data.

The above description of functions presents only a few examples of functions performed by the computing system of FIG. 7A and the nodes and/or client device in FIG. 7B. Other functions may be performed using one or more embodiments of the invention.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for executing a computerized query, comprising:
  receiving a new query from a user device, the new query comprising natural language text;
  selecting, by a computer processor, based on a type of user, and using an alternative term generator, a selected data model from among a plurality of pre-determined data models, the selected data model being particular to the type of user,
    wherein each of the plurality of pre-determined data models comprises a corresponding semantic graph data model, the corresponding semantic graph data model establishing a plurality of semantic relationships between a plurality of words,
    wherein the plurality of words correspond to past query words in a plurality of past queries in a specific domain and to domain words in domain-specific documents related to the specific domain,
    wherein the plurality of semantic relationships comprising numbers that define a closeness of the plurality of words to each other in the selected data model, and
    wherein the corresponding semantic graph data model comprises a graph comprising the plurality of words, the plurality of words distanced apart from each other in the graph to match a degree of semantic similarity between pairs of the plurality of words;
  comparing a plurality of query words in the natural language text to the selected data model using the alternative term generator to find at least one alternative term, the at least one alternative term having a semantic relationship to a query word in the plurality of query words, wherein the semantic relationship exceeds a first threshold value;
  substituting the at least one alternative term for a query word to form a revised query;

boosting, after substituting, the at least one alternative term, wherein the revised query is modified by boosting to form a boosted revised query that is used in place of the revised query; and executing, after boosting, the revised query on a search engine using the at least one alternative term.

2. The method of claim 1, further comprising:
extracting the plurality of query words from the natural language text using a natural language extractor.

3. The method of claim 1 further comprising:
determining, by the computer processor, the type of user.

4. The method of claim 3, wherein determining the type of user is performed by one of:
selecting the type based on the natural language text in the new query; and
selecting the type based on a user input.

5. The method of claim 1 wherein boosting comprises:
comparing the numbers to a second threshold value greater than the first threshold value;
assigning corresponding boost values to a subset of alternative terms that have specified numbers that are less than the second threshold value, wherein the corresponding boost values are less than one.

6. The method of claim 1 wherein boosting comprises:
assigning corresponding boost values to a subset of alternative terms proportionally according to the plurality of semantic relationships.

7. The method of claim 1 further comprising:
assigning corresponding boost values to ones of a subset of alternative terms based on unsupervised machine learning performed on a plurality of past user queries to find terms that are related, wherein terms determined by an unsupervised machine learning to be more closely related receive higher boost values.

8. The method of claim 1 further comprising:
building the plurality of pre-determined data models by:
receiving a plurality of past domain-specific queries from users of the type of user, the plurality of past domain-specific queries comprising words in natural language text;
receiving domain-specific documents comprising domain words in the natural language text describing information in a specific information domain that corresponds to the plurality of past domain-specific queries, wherein together the plurality of past domain-specific queries and the domain-specific documents comprise an input;
establishing the plurality of semantic relationships between the words from the plurality of past domain-specific queries and the domain words from the domain-specific documents, wherein establishing is performed by an unsupervised machine learning model operating on the input to correlate a given word in the words to other words in the domain words, and wherein establishing further includes determining semantic similarities between the given word and the other words, the semantic similarities comprising numbers between zero, representing no correlation in meaning, and one, representing a perfect match in meaning; and
building a plurality of semantic graph data models using the semantic similarities, wherein distances on the corresponding semantic graph data model between the given word and the other words represent the semantic similarities.

9. The method of claim 8, wherein building the plurality of semantic graph data models further comprises:
clustering related terms by the distances into clusters.

10. The method of claim 9, wherein clustering further comprises:
classifying the clusters according to corresponding semantic intents of the clusters.

11. The method of claim 9, wherein building the plurality of semantic graph data models further comprises:
representing semantic categories in the plurality of semantic graph data models as nodes of the corresponding semantic graph data model, wherein the plurality of semantic graph data models further comprises directed acyclic graphs.

12. The method of claim 8, further comprising:
generating, using the selected data model, a list of related words related to a selected word.

13. The method of claim 12, wherein generating comprises:
adding a related word to the list of related words responsive to the related word having a similarity score, relative to the selected word, that exceeds a first threshold value.

14. A system comprising:
a computer processor;
a persistent storage device storing:
a plurality of past domain-specific queries from users of a defined type, the plurality of past domain-specific queries comprising natural language text, and
a plurality of domain-specific documents comprising the natural language text describing information in a specific information domain that corresponds to the plurality of past domain-specific queries, wherein together the plurality of past domain-specific queries and the plurality of domain-specific documents comprise an input;
a machine learning model trainer for executing on the computer processor to cause the computer processor to train a machine learning model using the plurality of past domain-specific queries and the plurality of domain-specific documents to create a trained machine learning model;
a semantic graph data model generator for executing on the computer processor to cause the computer processor to:
use the trained machine learning model to establish semantic relationships between a plurality of words from the plurality of past domain-specific queries and domain words from the plurality of domain-specific documents,
determine semantic similarities between the plurality of words and the domain words, the semantic similarities between a first number representing no correlation in meaning and a second number representing a perfect match in meaning, and
build a semantic graph data model using the semantic similarities, wherein the semantic graph data model comprises a graph comprising the plurality of words, the plurality of words distanced apart from each other in the graph to match a degree of semantic similarity between pairs of the plurality of words;
a natural language extractor for executing on the computer processor to cause the computer processor to extract query words from natural language text of a new query received from a user;
an alternative term generator for executing on the computer processor to cause the computer processor to compare the query words to a graph database model to find alternative terms that have particular semantic relationships to the query words that exceed corresponding threshold values; and to substitute the alternative terms for the query words to form a revised query;

a booster for executing on the computer processor to cause the computer processor, prior to executing the revised query, to boost an alternative term based on a semantic similarity in a semantic relationship between the alternative term and at least one of the query words, wherein a boosted revised query is used in place of the revised query; and a search engine for executing on the computer processor to cause the computer processor to execute, after boosting, the revised query using the alternative terms.

15. The system of claim 14, further comprising:

a list generator for executing on the computer processor to cause the computer processor to generate, using the semantic graph data model, a list of related words related to a given word.

16. The system of claim 15, wherein the list generator is further for executing on the computer processor to cause the computer processor to add a related word to the list of related words responsive to the related word having a similarity score, relative to the given word, that exceeds a threshold value.

17. The system of claim 14, wherein the booster is further programmed to cause the computer processor to compare a number for an alternative term to a second threshold value; and assign a corresponding boost value to the alternative term when the number is less than the second threshold value.

18. A persistent storage device comprising computer readable program code for causing a computing system to:

build a plurality of pre-determined data models by:

receiving a plurality of past domain-specific queries from users of a type of user, the plurality of past domain-specific queries comprising words in natural language text;

receiving domain-specific documents comprising domain words in the natural language text describing information in a specific information domain that corresponds to the plurality of past domain-specific queries, wherein together the plurality of past domain-specific queries and the domain-specific documents comprise an input;

establishing a plurality of semantic relationships between the words from the plurality of past domain-specific queries and the domain words from the domain-specific documents, wherein establishing is performed by an unsupervised machine learning model operating on the input to correlate a given word in the words to other words in the domain words, and wherein establishing further includes determining semantic similarities between the given word and the other words, the semantic similarities comprising numbers between zero, representing no correlation in meaning, and one, representing a perfect match in meaning; and building a plurality of semantic graph data models using the semantic similarities, wherein distances on each of the plurality of semantic graph data models between the given word and the other words represent the semantic similarities, wherein each of the plurality of pre-determined data models comprises a corresponding semantic graph data model, the corresponding semantic graph data model establishing the plurality of semantic relationships between a plurality of words, wherein the corresponding semantic graph data model comprises a graph comprising the plurality of words, the plurality of words distanced apart from each other in the graph to match a degree of semantic similarity between pairs of the plurality of words;

receive a new query from a user device, the new query comprising natural language text;

select, by a computer processor, based on the type of user, and using an alternative term generator, a selected data model from among the plurality of pre-determined data models, the selected data model being particular to the type of user;

compare a plurality of query words in the natural language text to the selected data model using the alternative term generator to find at least one alternative term, the at least one alternative term having a semantic relationship to a query word in the plurality of query words, wherein the semantic relationship exceeds a first threshold value;

substitute the at least one alternative term for the query word to form a revised query; and execute the revised query on a search engine using the at least one alternative term.

* * * * *